United States Patent [19]

Engl

[11] Patent Number: 4,483,139

[45] Date of Patent: Nov. 20, 1984

[54] VALVE CONSTRUCTION PARTICULARLY FOR RAM JET ROCKET ENGINES AND TO A RAM JET ROCKET ENGINE CONSTRUCTION

[75] Inventor: Ernst Engl, Munich, Fed. Rep. of Germany

[73] Assignee: Messerschmitt-Bolkow-Blohm GmbH, Fed. Rep. of Germany

[21] Appl. No.: 441,100

[22] Filed: Nov. 12, 1982

[30] Foreign Application Priority Data

Nov. 12, 1981 [DE] Fed. Rep. of Germany ....... 3144936

[51] Int. Cl.³ .............................................. F02K 9/06
[52] U.S. Cl. ....................................... 60/251; 60/254; 60/270.1; 60/917; 251/248
[58] Field of Search ....................... 60/251, 254, 270.1, 60/917; 137/599; 251/117, 248, 273, 318

[56] References Cited

U.S. PATENT DOCUMENTS

| | | | |
|---|---|---|---|
| 1,311,642 | 7/1919 | Deinert | 137/614.2 |
| 2,452,441 | 10/1948 | Dube | 137/599 X |
| 2,935,084 | 5/1960 | Crawford et al. | 137/599 X |
| 2,948,112 | 8/1960 | Smith | 60/270.1 X |
| 3,065,597 | 11/1962 | Adamson et al. | 60/254 X |
| 3,691,770 | 9/1972 | Nunn | 60/254 |
| 3,712,058 | 1/1973 | Cooper | 60/254 X |

FOREIGN PATENT DOCUMENTS

| | | | |
|---|---|---|---|
| 133326 | 6/1902 | Fed. Rep. of Germany | 251/248 |
| 3006298 | 8/1981 | Fed. Rep. of Germany | 137/599 |
| 3005864 | 9/1981 | Fed. Rep. of Germany | 60/917 |
| 1378866 | 10/1964 | France | 60/251 |
| 2109035 | 5/1972 | France | 251/248 |

Primary Examiner—Louis J. Casaregola
Assistant Examiner—Donald E. Stout
Attorney, Agent, or Firm—McGlew and Tuttle

[57] ABSTRACT

A ram jet rocket includes a precombustion chamber having a solid fuel propellant which burns off so that the gases generated are deficient in oxygen when they pass through a central aperture of a valve body into a main combustion chamber in which they are further burned. The valve body aperture is closed by a bore control member which is urged into a proper setting position by a push rod mounted behind the ball downstream of the aperture. The valve body defines an annular nozzle extending from the aperture downstream through one or more elbow passages into a corresponding number of axially extending passages into the main combustion chamber. The valve construction is characterized by at least one by-pass passage which extends from the upstream end of the valve body into the elbow passage which leads to the axial passage.

2 Claims, 1 Drawing Figure

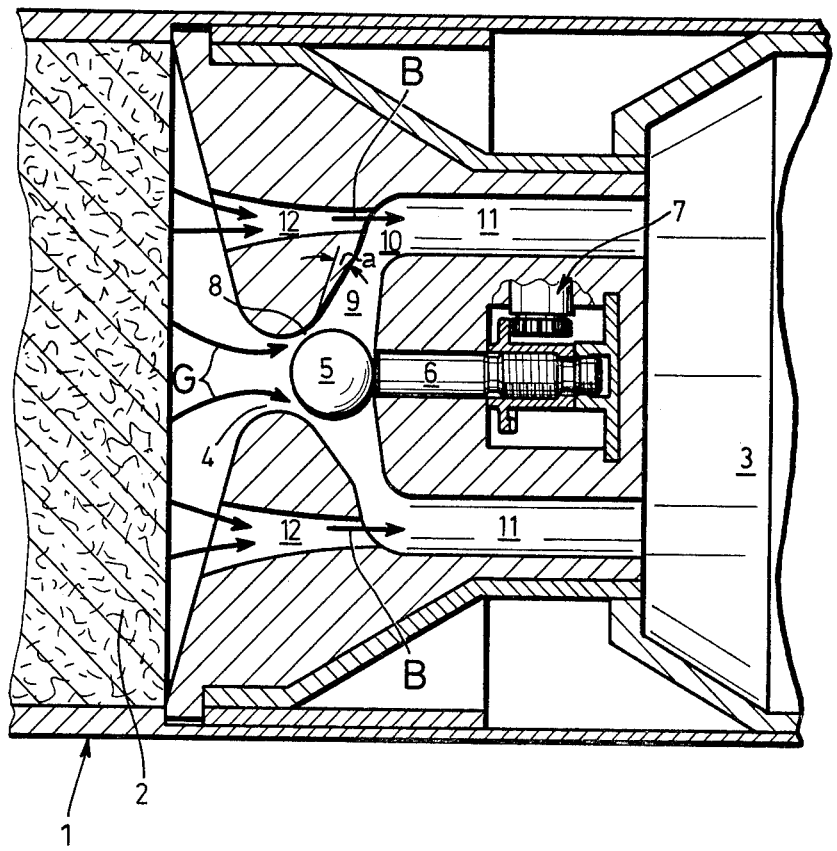

10

VALVE CONSTRUCTION PARTICULARLY FOR RAM JET ROCKET ENGINES AND TO A RAM JET ROCKET ENGINE CONSTRUCTION

FIELD AND BACKGROUND OF THE INVENTION

This invention relates in general to ram jet rocket engines and in particular to a new and useful control valve for regulating the flow of precombustion gases between a precombustion chamber and a main combustion chamber.

In machine construction, control valves for metering the flow of fluids and hydraulically or pneumatically operated devices are known in a variety of designs. In general, such movable mechanical component parts are required to operate exactly, comply with the operating conditions, and be adequately shaped to minimize losses in flow. Further, these control members are to be as lightweight as possible, to reduce mass forces and permit high operating frequencies.

Ball controlled valves are also used in various machines. For example, German OS 28 16 806 shows in FIG. 5 a ball valve in an antiblocking device for vehicle brakes, in which the ball controlling the flow aperture is actuated by a push rod. The fluid flows through the valve, both in front of and behind the control aperture, in the axial direction.

With certain modes of operation, particular difficulties arise which call for specific properties of the employed valves, to overcome the problems. For example, in some thermal machines, such as ram jet rocket engines, operating with fuel-rich gases which are produced in a precombustion chamber from a solid chemical fuel and flow through one or more conduits into a main combustion chamber to which air oxygen is supplied for final stoichiometric combustion, solid particles are obtained in the hot gas stream. Being adhesive, these particles are extremely troublesome, they soil lines and, particularly, form deposits on the edges, in corners, recesses and cavities of the valves which may cause failures of these important elements.

The prior art valve construction of the above mentioned German OS 28 16 806 is still not capable of safely eliminating these damaging phenomena, since no particular measures are taken to actively prevent or fight deposits in the critical spaces, i.e. in the ball cavity and behind.

SUMMARY OF THE INVENTION

The invention is directed to the elimination of the drawbacks of the prior art valves and to a construction which operates smoothly and is lightweight, so that only small setting forces are needed, the invention makes possible a space-saving arrangement and, primarily, actively and safely prevents particles contained in the hot gas stream from depositing, so that a full operating capability of the valve under thermally extreme operating conditions is ensured.

In accordance with the invention a valve is located for controlling the flow of gases particularly between a precombustion and main combustion chamber of a ram jet engine which includes an upstream side leading to an aperture for the flow of gases which is regulated by a ball valve which is positioned by a setting member located downstream of the ball valve. The valve body includes an annular nozzle passage which leads to an elbow passage connected to an axial passage and in accordance with the invention one or more bypass nozzles are arranged between the upstream side of the valve body and the axial passage.

The inventive construction is inexpensive to manufacture, operates smoothly, includes only small masses, requires but a small space for accommodation and, due to its manner of operation and design favorable to the fluid flow, remains free from undesirable deposits even if exposed to the flow of hot gases strongly laden with solid particles (up to 50% of solid matter), so that its operativeness is guaranteed.

Accordingly it is an object of the invention to provide an improved ram jet construction having an improved valve for the control of gases from a precombustion chamber to a main combustion chamber.

A further object of the invention is to provide a control valve which is regulated by a ball member which is subjected to high temperatures and becomes fouled with gaseous products of combustion which includes an annular nozzle passage extending from the aperture controlled by the valve to one or more axial passages extending to the main combustion chamber and wherein at least one bypass nozzle extends from the upstream end of the valve body to the axial passage.

A further object of the invention is to provide a valve for a ram jet engine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE of the drawing is a partial axial sectional view of a ram jet engine constructed in accordance with the invention.

GENERAL DESCRIPTION OF THE PREFERRED EMBODIMENT

According to the drawing in particular the invention therein comprises a ram jet engine with a valve construction which is provided for regulating the flow of fuel-rich gases which are burned in a precombustion chamber portion 1 having a solid fuel 2 and flow into an upstream part of the valve body of the valve in the direction of the arrows 6. In accordance with the invention the valve body has an aperture 8 which is closed by a ball valve member 5 which is positioned in respect to the aperture by a setting bolt 6 which is mounted for axial movement behind the ball. Each of the valve bodies define an annular nozzle 9 extending from the aperture 8 downstream of the ball and lead to an elbow passage 10 and an axial passage 11 extending outwardly downstream of the nozzle to the main combustion chamber 3. The nozzle has a wall existing from the aperture sufficiently large to prevent locking of the ball in the space downstream of the aperture adjacent the nozzle 9. In accordance with a feature of the invention a plurality of bypass nozzles 12 are defined between the precombustion chamber 1 and the elbow passage 10 at the juncture of the nozzle and the axial passage.

In the precombustion chamber 1, in which the solid propellant 2 which deficient in oxygen is received, fuel-rich gases G are produced by burning the propellant, which flow in a metered amount through the ball-controlled valve into the main combustion chamber 3 to which air oxygen is supplied in addition, to obtain a stoichiometric combustion.

The valve cross-section in the form of a rounded aperture 4 is controlled by ball 5 which is moved back and forth by push rod 6 actuated through a screw mechanism 7.

The fuel-rich gas G flows away behind the throat 8 controlled by ball 5 first through a substantially radially directed annular nozzle 9. The nozzle 9 has a nozzle angle a preventing ball 5 from getting jammed by self-locking during its radial movements within annular nozzle 9. The fuel-rich gases G flow through elbow passage 10 and then through axially extending passages 11. Extending from the inner space of precombustion chamber 1, the bypass nozzles 12 are provided. They bypass the control member proper, i.e. the ball 5 or valve, and open directly into elbow passage 10.

The inventive construction operates advantageously as follows: As already mentioned, up to 50% of solid particles are obtained while combusting the solid propellant 2 to produce the fuel-rich gases G. Due to the high temperatures, these particles are in fused state wherefore they have the undesirable property of being very adhesive. Further, as mentioned above, the temperature of the fuel-rich gas G is very high, at least 2000° C. The control member, namely ball 5, is therefore exposed unilaterally to a thermal shock during the starting phase. Because of the assymetric flow past ball 5 and also the assymetric deposit of solid particles on the ball, the ball becomes unstable and is set in rotary motions which produce the effect that, first, ball 5 ceases to be heated unilaterally and, second, the deposits on ball 5 pass into different thermal regions, preferably into the turbulent region behind throat 8, where the deposits chip off the ball and are then entrained by the accelerated flow in the annular nozzle. The employed control ball 5, is thus an element which is most suitable for this purpose and for the given conditions, since, having an insured freedom of motion, it cannot become blocked, not even by self-locking because of the intentionally wider angle a of annular nozzle 9. Consequently, under stable operating conditions, ball 5 will oscillate about its ideal central position in spite of all adverse conditions and will reliably perform its function as a member for controlling a satisfactorily accurate metering of the gas amounts.

The inventive valve construction also solves the second problem of a possible clogging of elbow passage 10 where solid practicles are deposited and adhere under the centrifugal force caused by the change in flow direction. These deposits are forcibly removed again and entrained by the accelerated flow B through bypass nozzles 12, so that they pass with the principal stream to main combustion chamber 3 where they melt or sublimate and are combusted.

While a specific embodiment of the invention has been shown and described in detail to illustrate the application of the principles of the invention, it will be understood that the invention may be embodied otherwise without departing from such principles.

What is claimed is:

1. A ram jet nozzle construction including means defining a precombustion chamber (1) having a solid fuel therein, a main combustion chamber (3) spaced from said precombustion chamber and a valve body disposed in the space between said main combustion chamber and said precombustion chamber, said valve body having an upstream end with a central flow aperture (4), a ball (5) adapted to be moved into the aperture to close off the flow, a setting bolt (6) mounted for axial movement behind said ball to move against said ball for positioning said ball in respect to said aperture, means in said valve body defining an annular nozzle (9) extending radially outwardly from said aperture downstream thereof and of said ball, means defining an elbow passage (10) connected to said annular nozzle at a radially outer end thereof, an axial passage (11) connected to said elbow passage extending downstream of said elbow passage, said nozzle having a wall adjacent the aperture disposed at an angle (a) sufficiently large to prevent the locking of said ball therein, and a plurality of bypass nozzles (12) extending from said upstream end into said elbow passage (10), whereby when solids containing hot gases are generated by the solid fuel and pass said aperture and said ball, said ball is pushed radially and assymetrically into said nozzle and caused to rotate so as to avoid desposition of solids on said ball.

2. In a ram jet engine having a precombustion chamber for containing a solid fuel which is capable of generating fuel-rich gases having a high temperature and a high proportion of solid particles, and a main combustion chamber for receiving the fuel-rich gases, a valve arrangement for controlling and metering an amount of the fuel-rich gases flowing from the precombustion chamber to the main combustion chamber, comprising:

first means for defining a central flow aperture between the precombustion chamber and the main combustion chamber through which an amount of fuel-rich gases can pass;

second means between said first means and the main combustion chamber for defining a cross sectional control area with a substantially radially extending annular nozzle for receiving the amount of fuel-rich gases, said second means including a bounding wall extending at a selected angle, said second means defining an elbow passage connected to said annular nozzle and an axial passage connected to said elbow passage for conducting fuel-rich gases from said annular nozzle to the main combustion chamber;

a ball movably positioned in said annular nozzle, said selected angle of said bounding wall being chosen to permit radial movement of said ball and to avoid locking of said wall against said bounding wall;

bolt means mounted for axial movement to said second means and against said ball for urging said ball along said cross sectional control area and toward said aperture for metering the amount of fuel-rich gases entering said annular nozzle from said aperture; and, said first means defining a plurality of bypass nozzles communicating between the precombustion chamber and said elbow passage and distributed around said central aperture for permitting a flow of fuel-rich gases to bypass said central aperture and flow directly from the precombustion chamber to the main combustion chamber.

* * * * *